(12) United States Patent
Nanri et al.

(10) Patent No.: US 10,994,730 B2
(45) Date of Patent: May 4, 2021

(54) TRAVELING ASSISTANCE METHOD AND TRAVELING ASSISTANCE DEVICE

(71) Applicant: Nissan Motor Co., Ltd., Yokohama (JP)

(72) Inventors: Takuya Nanri, Kanagawa (JP); Fang Fang, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/605,347

(22) PCT Filed: Apr. 19, 2017

(86) PCT No.: PCT/JP2017/015672
§ 371 (c)(1),
(2) Date: Oct. 15, 2019

(87) PCT Pub. No.: WO2018/193535
PCT Pub. Date: Oct. 25, 2018

(65) Prior Publication Data
US 2020/0331470 A1 Oct. 22, 2020

(51) Int. Cl.
*B60W 30/095* (2012.01)
*B60W 30/09* (2012.01)
*G06K 9/00* (2006.01)

(52) U.S. Cl.
CPC ........ *B60W 30/0956* (2013.01); *B60W 30/09* (2013.01); *G06K 9/00798* (2013.01); *G06K 9/00805* (2013.01); *B60W 2554/4041* (2020.02); *B60W 2554/4046* (2020.02)

(58) Field of Classification Search
None
See application file for complete search history.

(56) References Cited

U.S. PATENT DOCUMENTS

| | | | |
|---|---|---|---|
| 8,660,778 B2 | 2/2014 | Taguchi | |
| 2009/0037088 A1 | 2/2009 | Taguchi | |
| 2009/0252380 A1 | 10/2009 | Shimizu | |
| 2011/0137562 A1 | 6/2011 | Taguchi | |
| 2012/0059789 A1* | 3/2012 | Sakai | G08G 1/161 706/52 |
| 2015/0142285 A1* | 5/2015 | Nagata | G08G 1/166 701/70 |

FOREIGN PATENT DOCUMENTS

| | | |
|---|---|---|
| JP | 2009037561 A | 2/2009 |
| JP | 2009116790 A | 5/2009 |
| JP | 201079565 A | 4/2010 |
| JP | 2012104029 A | 5/2012 |
| JP | 5024255 B2 | 9/2012 |
| JP | 5098584 B2 | 12/2012 |
| WO | 2016104198 A1 | 6/2016 |

* cited by examiner

*Primary Examiner* — Navid Ziaeianmehdizadeh
(74) *Attorney, Agent, or Firm* — Young Basile Hanlon & MacFarlane, P.C.

(57) ABSTRACT

A traveling assistance method detects another vehicle and objects around a host vehicle, sets a blind spot area from the other vehicle, specifies an object present in the blind spot area among the detected objects, and predicts an action that the other vehicle takes in accordance with the specified object.

15 Claims, 9 Drawing Sheets

US 10,994,730 B2

TRAVELING ASSISTANCE METHOD AND TRAVELING ASSISTANCE DEVICE

TECHNICAL FIELD

The present invention relates to a traveling assistance method and a traveling assistance device for predicting an action of another vehicle around a host vehicle.

BACKGROUND

A vehicle control device is known that controls a vehicle depending on the corresponding conditions when the vehicle is traveling under the presence of a blind spot (WO 2016/104198). The vehicle control device disclosed in Patent Document 1 determines the relative priority between a route that the host vehicle is following and a route that another vehicle is following, so as to predict the action of the other vehicle in accordance with the determined priority.

SUMMARY

The vehicle control device disclosed in WO 2016/104198 still has a problem of accurately predicting the action of the other vehicle in a situation in which the host vehicle should yield the way to the other vehicle in view of the timing, even though the host vehicle has higher priority on the road over the other vehicle, or a traveling situation in which the host vehicle should move ahead first in view of the timing, even though the host vehicle needs to give priority to the other vehicle on the road.

To solve the conventional problems described above, the present invention provides a traveling assistance method and a traveling assistance device capable of improving the accuracy of predicting an action of another vehicle.

A traveling assistance method according to an aspect of the present invention detects another vehicle and objects around a host vehicle, sets a blind spot area from the other vehicle, specifies an object present in the blind spot area among the detected objects, and predicts an action that the other vehicle takes in accordance with the specified object.

The aspect of the present invention can improve the accuracy of predicting the action of the other vehicle.

DETAILED DESCRIPTION

Hereinafter, an embodiment will be described in detail with reference to the drawings.

Figure 4:
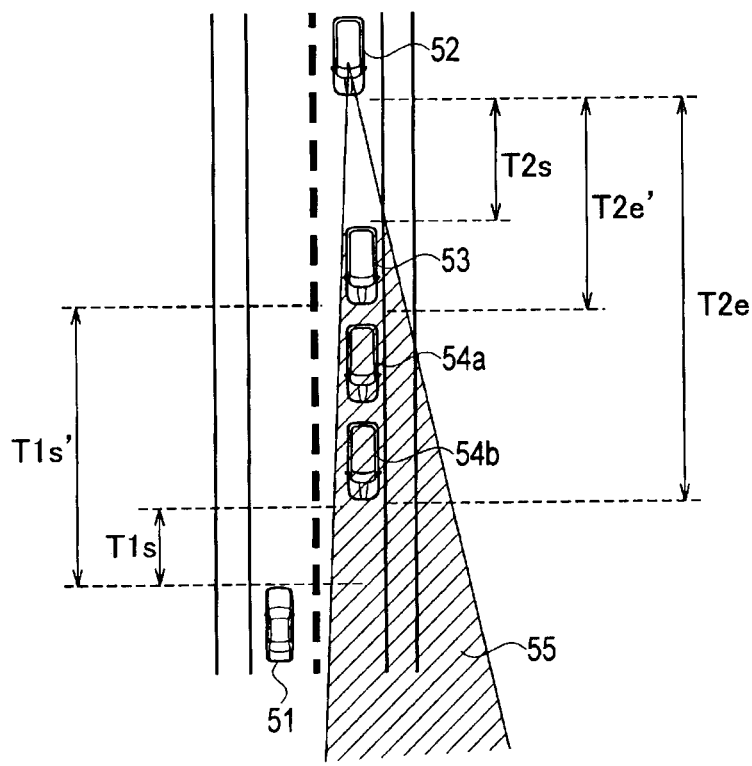
FIG. 4 is a zenith view showing a traveling situation in which a host vehicle 51 is traveling in its traveling lane on a two-lane oncoming road, and another vehicle 52 is traveling ahead of the host vehicle 51 in the oncoming lane.

A traveling assistance device according to the embodiment is effective for use in a traveling situation as shown in FIG. 4, for example. FIG. 4 illustrates a case in which a host vehicle 51 is traveling in its traveling lane on a two-lane oncoming road, and another vehicle 52 is traveling ahead of the host vehicle 51 in the oncoming lane. A plurality of parked vehicles (examples of objects) (53, 54a, and 54b) are stopping in line in the oncoming lane between the host vehicle 51 and the other vehicle 52. Since the host vehicle 51 and the other vehicle 52 cannot simultaneously pass by these parked vehicles, either the host vehicle 51 or the other vehicle 52 needs to yield the way to the other to let it pass by first.

Figure 5A:
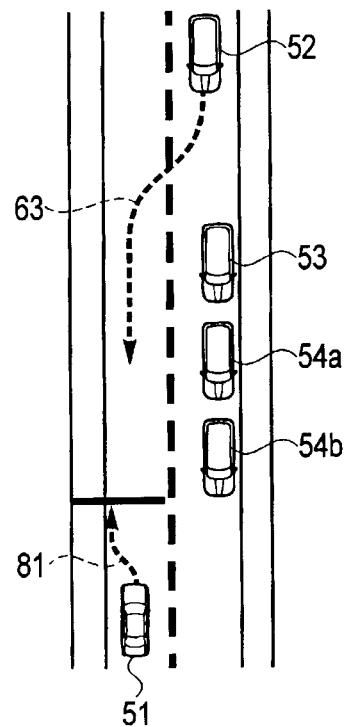
FIG. 5A is a zenith view of the traveling situation shown in FIG. 4 in which the other vehicle 52 is deviating from the oncoming lane to enter the traveling lane of the host vehicle 51.
Figure 5B:
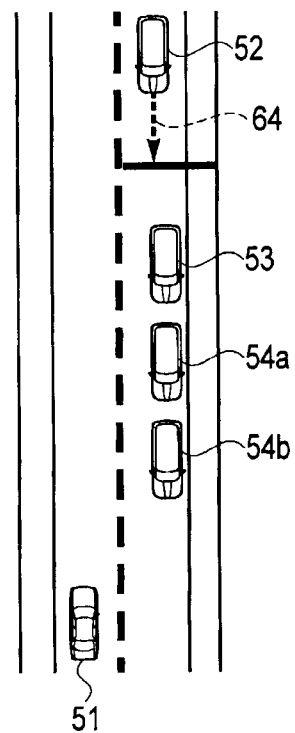
FIG. 5B is a zenith view of the traveling situation shown in FIG. 4 in which the other vehicle 52 makes a stop in front of a parked vehicle 53.

The host vehicle 51 has priority on this road over the other vehicle 52. In addition, a presumed time $T1s$ that the host vehicle 51 needs to reach the parked vehicle $54b$ is shorter than a presumed time $T2s$ that the other vehicle 52 needs to reach the parked vehicle 53. The host vehicle 51 thus determines that the host vehicle 51 should take an action prior to the other vehicle 52 in view of both the priority on the road and the timing. As shown in FIG. 5B, the host vehicle 51 then predicts the action of the other vehicle 52 that would stop in front of the parked vehicle 53.

The situation in which the plural parked vehicles (53, 54a, and 54b) are stopping in line causes a blind spot area 55 from the other vehicle 52 due to the presence of the parked vehicle 53, and the other parked vehicles (54a and 54b) are included in the blind spot area 55. Since the other vehicle 52 fails to recognize the other parked vehicles (54a and 54b), an object detection sensor mounted on the other vehicle 52 cannot detect the other parked vehicles (54a and 54b), while the host vehicle 51 is aware of these parked vehicles (54a and 54b). The other vehicle 52 would then incorrectly compare a presumed time $T1s'$ that the host vehicle 51 needs to reach the parked vehicle 53 with the presumed time $T2s$. When the presumed time $T1s'$ is longer than the presumed time $T2s$, the other vehicle 52 wrongly determines that the other vehicle 52 should move ahead prior to the host vehicle 51, leading to deviation from its traveling lane to enter the lane in which the host vehicle is traveling, as shown in FIG. 5A. Such a situation could have the influence on the traveling condition of the host vehicle 51 such that the deviating other vehicle 52 blocks the forward movement of the host vehicle 51 in the lane in which the host vehicle 51 is traveling, for example. This wrong determination tends to cause under the circumstances in which the traveling condition, such as traveling during the night or in fog, or traveling with the presence of obstacles (such as road repairs and signs), leads to poor visibility of an occupant, causing the other vehicle 52 to deviate toward the lane in which the host vehicle is traveling, as shown in FIG. 5A. The embodiment of the present invention thus may be applied only to the case in which the occupant has poor visibility depending on the traveling condition.

As described above, the host vehicle 51 may fail to accurately predict the action of the other vehicle 52 when the other vehicle 52 is not aware of the parked vehicles (54a and 54b), while the host vehicle 51 recognizes these parked vehicles. The host vehicle 51 would then need to immediately change its behavior if the host vehicle 51 cannot predict the action of the other vehicle 52 that would deviate toward the lane of the host vehicle 51, causing the occupant of the host vehicle 51 to feel uncomfortable.

The traveling assistance device according to the embodiment thus predicts the action of the other vehicle 52 while taking account of the condition in the blind spot area 55 which can be seen by the host vehicle 51, but cannot be recognized by the other vehicle 52. The traveling assistance device then controls the host vehicle 51 in accordance with the predicted action of the other vehicle 52. The traveling assistance device thus can accurately predict the action of the other vehicle 52 in the traveling situation in which the host vehicle 51 needs to yield the way to the other vehicle 52 in view of the timing, even though the host vehicle 51 has higher priority on the road over the other vehicle 52, or the traveling situation in which the host vehicle 51 should move ahead first in view of the timing, even though the host vehicle 51 is to give priority on the road to the other vehicle 52. As used herein, the expression "can be seen by the vehicle" encompasses the concept that not only the driver of the vehicle can visually recognize a situation, but also an object detection sensor mounted on the vehicle can detect the situation. The term "blind spot area" includes not only a blind spot from an occupant (driver or passenger), but also an area excluding a detection area detected by the object detection sensor mounted on the vehicle, or an area ahead of an obstacle on the other side from the vehicle when the obstacle is present in front of the vehicle in the direction connecting the vehicle and the obstacle. The blind spot area may be estimated by the host vehicle when the host vehicle comes across the other vehicle, or may be preliminarily calculated so as to be employed when the host vehicle comes across the other vehicle. Alternatively, the host vehicle may externally acquire the information on the blind spot area through vehicle-to-vehicle communications or road-to-vehicle communications.

The configuration of the traveling assistance device according to the embodiment is described below with reference to FIG. 1. The traveling assistance device includes an object detection device 1, a host-vehicle position estimation device 3, a map acquisition device 4, and a microcomputer 100.

The object detection device 1 includes various kinds of object detection sensors mounted on the host vehicle 51, such as a laser radar, a millimeter-wave radar, and a camera, for detecting objects around the host vehicle 51. The object detection device 1 detects objects around the host vehicle 51 using these object detection sensors. The object detection device 1 detects moving objects such as other vehicles, motorcycles, bicycles, and pedestrians, and stationary objects such as parked vehicles. For example, the object detection device 1 detects a position, an attitude, a size, a velocity, acceleration, deceleration, and a yaw rate of a moving object or a stationary object on the basis of the host vehicle. As used herein, a position, an attitude (a yaw angle), a size, a velocity, acceleration, deceleration, and a yaw rate of an object are collectively referred to as "behavior" of the object. The object detection device 1 outputs, as detection results, the behavior of a two-dimensional object in the zenithal view (also referred to as a plan view) as viewed from the air above the host vehicle 51, for example.

The host-vehicle position estimation device 3 includes a position detection sensor such as a global positioning system (GPS) and a means of odometry for measuring an absolute position of the host vehicle 51. The host-vehicle position estimation device 3 measures the absolute position of the host vehicle 51, which is the position, the attitude, and the velocity of the host vehicle 51 based on a predetermined reference point, by use of the position detection sensor.

The map acquisition device 4 acquires map information indicating a structure of a road on which the host vehicle 51 is traveling. The map information acquisition device 4 may hold map database storing the map information, or may acquire the map information from an external map data server through cloud computing. The map information acquired by the map acquisition device 4 includes various pieces of information on the road structure, such as absolute positions of lanes, and a connectional relation and a relative positional relation of lanes.

The microcomputer 100 (an example of a controller) predicts an action of another vehicle in accordance with the detection results obtained by the object detection device 1 and the host-vehicle position estimation device 3 and the information acquired by the map acquisition device 4, generates a route of the host vehicle 51 depending on the action of the other vehicle, and controls the host vehicle 51 in accordance with the generated route.

The embodiment exemplifies the microcomputer 100 as the traveling assistance device for controlling the host vehicle 51, but is not limited to this case. For example, the microcomputer 100 may be applicable to the case of functioning as an action prediction device for predicting the action of the other vehicle. The microcomputer 100 thus may finally output the predicted action of the other vehicle without the route generation or the traveling control along the route generated for the host vehicle 51.

The microcomputer 100 is a general-purpose microcomputer including a central processing unit (CPU), a memory, and an input-output unit. A computer program (a traveling assistance program) is installed on the microcomputer 100 so as to function as the traveling assistance device. The microcomputer 100 functions as a plurality of information processing circuits (2a, 2b, 5, 10, 21, and 22) included in the traveling assistance device when the computer program is executed. While the embodiment is illustrated with the case in which the software is installed to fabricate the information processing circuits (2a, 2b, 5, 10, 21, and 22) included in the traveling assistance device, dedicated hardware for executing each information processing as described below can be prepared to compose the information processing circuits (2a, 2b, 5, 10, 21, and 22). The respective information processing circuits (2a, 2b, 5, 10, 21, and 22) may be composed of individual hardware. The information processing circuits (2a, 2b, 5, 10, 21, and 22) may also serve as an electronic control unit (ECU) used for other control processing with respect to the vehicle.

The microcomputer 100 includes, as the respective information processing circuits (2a, 2b, 5, 10, 21, and 22), a detection integration unit 2a, an object tracking unit 2b, a position-in-map calculation unit 5, an action prediction unit 10, a host-vehicle route generation unit 21, and a vehicle control unit 22. The action prediction unit 10 includes a behavior determination unit 11, an action candidate prediction unit 12, a first action-candidate correction unit 13, a second action-candidate correction unit 15, a course prediction unit 16, a likelihood estimation unit 17, a blind spot area detection unit 18, an obstructed object extraction unit 19, and an obstructed object course prediction unit 14. When the microcomputer 100 is used as the action prediction device for predicting the action of the other vehicle, the information processing circuits as the host-vehicle route generation unit 21 and the vehicle control unit 22 are not necessarily included.

The detection integration unit 2a integrates several detection results obtained by the respective object detection sensors included in the object detection unit 1 to output a single detection result per object. In particular, the detection integration unit 2a calculates the behavior of an object, which is the most reasonable and has the least error among pieces of the behavior of the object detected by the respective object detection sensors, in view of error characteristics of the respective object detection sensors. The detection integration unit 2a collectively evaluates the detection results obtained by the various sensors so as to obtain a more accurate detection result for each object by a conventional sensor fusion method.

The object tracking unit 2b tracks each object detected by the object detection device 1. In particular, the object tracking unit 2b determines the sameness of the object (mapping) detected at intervals in accordance with the behavior of the object output at different times, by use of the detection result integrated by the detection integration unit 2a, and predicts the behavior of the object in accordance with the mapping result. Each piece of the behavior of the object output at different times is stored in the memory in the microcomputer 100, and is used for course prediction described below.

The position-in-map calculation unit 5 estimates the position and the attitude of the host vehicle 51 on the map according to the absolute position of the host vehicle 51 acquired by the host-vehicle position estimation device 3 and the map data acquired by the map acquisition device 4. For example, the position-in-map calculation unit 5 specifies both the road on which the host vehicle 51 is traveling, and the traveling lane of the host vehicle 51 on the road.

The action prediction unit 10 predicts an action of a moving object around the host vehicle 51 in accordance with the detection result obtained by the detection integration unit 2a and the position of the host vehicle 51 specified by the position-in-map calculation unit 5. The specific configuration of the action prediction unit 10 is described in detail below.

The behavior determination unit 11 specifies the position and the behavior of the object on the map in accordance with the position of the host vehicle 51 on the map and the behavior of the object acquired by the detection integration unit 2a. The behavior determination unit 11 determines that the object is a moving object when the position of the object on the map changes with the passage of time, and determines the attribute of the moving object (a vehicle or a pedestrian, for example) in accordance with the size and the velocity of the moving object. When the moving object is determined to be another traveling vehicle, the behavior determination unit 11 specifies the road on which the other vehicle is traveling and its traveling lane.

When the position of the object on the map does not change with the passage of time, the behavior determination unit 11 determines that the object is a stationary object, and determines the attribute of the stationary object (a parked vehicle or a pedestrian, for example) in accordance with the position on the map, the attitude, and the size of the stationary object.

The action candidate prediction unit 12 predicts an action candidate of the other vehicle based on the map. The action candidate prediction unit 12 predicts the intention of action that the other vehicle would take next, based on the road structure included in the map information and the information of the lane to which the other vehicle belongs, and calculates a primary course of the other vehicle in accordance with the predicted intention of action based on the road structure. As used herein, the term "action candidate" refers to a superordinate concept including the intention of action and the primary course. The term "primary course" encompasses profiles of positions of the other vehicle at different times and also profiles of velocities of the other vehicle at the respective positions.

For example, when the other vehicle is traveling on a single curved road with a single lane, the action candidate prediction unit 12 predicts the intention of action of following the lane (forward movement), and calculates a course along the lane on the map as the primary course. When the other vehicle is traveling on a single curved road with a plurality of lanes, the action candidate prediction unit 12 predicts the intention of action of the forward movement and the intention of action of changing the lane to the right or the left (lane change). The primary course of the other vehicle with the intention of action upon the lane change is a course of changing lanes based on the road structure and a predetermined period of lane-change time. When the other vehicle is traveling toward an intersection, the action candidate prediction unit 12 predicts the intention of action including a forward movement, a right turn, and a left turn, and calculates a forward-movement course, a right-turn course, and a left-turn course as the primary course based on the road structure at the intersection on the map. The calculation of the "primary course" takes the road structure into consideration, but does not take account of the behavior of the other vehicle integrated by the detection integration unit 2a.

The first action-candidate correction unit 13 takes account of a stationary object detected by the object detection device 1 to correct the action candidate predicted by the action candidate prediction unit 12. In particular, the first action-candidate correction unit 13 determines whether the primary course of the other vehicle and the position of the stationary object overlap with each other. When the primary course and the position overlap with each other, the first action-candidate correction unit 13 further adds an intention of action and a primary course of the parallel-traveling vehicle 52 for avoiding the stationary object.

In particular, in the traveling situation shown in FIG. 4, the action candidate prediction unit 12 predicts the intention of action that the other vehicle 52 would take to follow the lane (forward movement) so as to calculate the primary course (forward movement). The first action-candidate correction unit 13 then determines that the primary course (forward movement) of the other vehicle 52 overlaps with the positions of the parked vehicles (53, 54a, and 54b) as stationary objects. The action candidate prediction unit 12 further adds the action candidate (primary course 63) that the other vehicle 52 would take to deviate to enter the lane in which the host vehicle 51 is traveling, as shown in FIG. 5A, and the action candidate (primary course 64) that the other vehicle 52 would take to make a stop in front of the parked vehicle 53, as shown in FIG. 5B.

When another moving object (not shown) is detected by the object detection device 1 simultaneously with the other vehicle 52 illustrated in FIG. 4, the first action-candidate correction unit 13 takes account of the other moving object to correct the action candidate predicted by the action candidate prediction unit 12. In particular, the first action-candidate correction unit 13 chronologically determines whether the other moving object and the parallel-traveling vehicle 52 overlap with each other. When the two moving objects overlap with each other, the first action-candidate correction unit 13 further adds an intention of action and a primary course of the other vehicle 52 for avoiding the other moving object.

The blind spot area detection unit 18 detects a blind spot area from the other vehicle 52 caused by objects detected by the object detection device 1. The objects detected by the object detection device 1 can cause the blind spot area from the other vehicle 52 around the host vehicle 51. The blind spot area detection unit 18 specifies the blind spot area from the other vehicle 52 on the map. In particular, the blind spot area detection unit 18 specifies the blind spot area 55 from the other vehicle 52 based on the positions of the objects (52, 53, 54a, and 54b) output from the object detection device 1, as shown in the zenith view of FIG. 4. The blind spot area detection unit 18 detects the blind spot area 55 from the other vehicle 52 caused by the parked vehicle 53.

The blind spot area detection unit 18 may first set an area which can be detected by the host vehicle 51 in the zenith view shown in FIG. 4, and then specify the blind stop area 55 which cannot be detected by the other vehicle 52 in the specified area. The blind spot area detection unit 18 thus can specify the blind spot area 55 which can be seen by the host vehicle 51, but cannot be recognized by the other vehicle 52. As described above, the determination of whether to see the blind spot area 55 may be made by either the driver of the vehicle or the object detection sensors mounted on the vehicle.

The blind spot area 55 is not limited to the two-dimensional area in the zenith view, and may be specified as a three-dimensional area having a height component (z component) in view of the height of the object. For example, the configuration of the blind spot area 55 in the height direction caused by the parked vehicle 53 may be determined depending on the height of the parked vehicle 53 shown in FIG. 4.

The blind spot area detection unit 18 does not necessarily calculate the blind spot area 55 from the other vehicle 52 in all directions of the other vehicle 52. The blind spot area detection unit 18 is only required to calculate the blind spot area in a region having an action candidate that the other vehicle 52 would move to, in accordance with the traveling direction and the position of the other vehicle 52, and the map information. The blind spot area detection unit 18 thus may specify the blind spot area 55 from the other vehicle 52 only in the region with the action candidate that the other vehicle 52 is to move to, in accordance with the position of the other vehicle 52, the traveling direction of the other vehicle 52, and the road structure around the other vehicle 52. This can reduce the calculation load of the microcomputer 100 without a decrease in accuracy of predicting the action of the other vehicle 52, effectively calculating the blind spot area 55 accordingly.

A threshold of time may be set for specifying the blind spot area 55. In particular, when a state in which the other vehicle 52 cannot see a particular area continues for a reference time (500 milliseconds) or longer, the blind spot area 55 from the other vehicle 52 may be determined to be caused. This can eliminate, from the blind spot area 55, an area which disappears from the sight of the other vehicle 52 for a short period of time which has no influence on the prediction of action of the other vehicle 52. This can reduce the calculation load of the microcomputer 100 to improve the calculation speed. The reference time is not limited to the fixed value, and may vary depending on the place and the conditions on the map.

The obstructed object extraction unit 19 extracts an object (obstructed object) present in the blind spot area 55 among the objects detected by the detection integration unit 2a. In other words, the obstructed object extraction unit 19 extracts an object in the blind spot area 55 detected by the host vehicle 51. The obstructed object extraction unit 19 thus can specify the object which can be seen by the host vehicle 51, but cannot be recognized by the other vehicle 52 (hereinafter referred to as an "obstructed object"). The obstructed object extraction unit 19 is only required to extract the obstructed object, and does not necessarily specify more information such as an attribute of the obstructed object (such as a pedestrian or a vehicle). The obstructed object may be detected by a sensor included in the host vehicle 51, or may be detected by another detection device not included in the host vehicle 51 so that the host vehicle 51 externally acquires the information detected by the detection device.

The detection integration unit 2a detects the parked vehicles (54a and 54b) in the traveling situation shown in FIG. 4. The obstructed object extraction unit 19 thus can extract the parked vehicles (54a and 54b) present in the blind spot area 55 as obstructed objects.

The obstructed object extraction unit 19 may take account of the heights of the blind spot area 55 and an object (obstructed object) to determine the presence of the object in the blind spot area 55. For example, when the height of the parked vehicle 53 is lower than the height of the parked vehicle 54a in the traveling situation shown in FIG. 4, the height of the blind spot area 55 is also lower than the height of the parked vehicle 54a. In this case, the obstructed object extraction unit 19 does not determine that the parked vehicle 54a is included in the blind spot area 55, since the other vehicle 52 can detect a part of the parked vehicle 54a. The obstructed object extraction unit 19 thus may determine whether the entire object is included in the blind spot area 55 while taking account of the height component of the blind spot area 55.

The obstructed object course prediction unit 14 predicts a course of the object in accordance with the behavior of the object present in the blind spot area 55 specified by the behavior determination unit 11. When the obstructed object is a moving object, the obstructed object course prediction unit 14 can predict the action of the other vehicle 52 based on the behavior of the object. The obstructed object course prediction unit 14 first predicts a course of the obstructed object based on the behavior of the obstructed object. For example, when the parked vehicle 54b turns on the directional signal indicating the right turn in the traveling situation shown in FIG. 4, the obstructed object course prediction unit 14 predicts a starting action of the parked vehicle 54b and a course upon the starting action in accordance with the behavior of the parked vehicle 54b. The obstructed object course prediction unit 14 may predict the traveling direction of the object based on its velocity.

The second action-candidate correction unit 15 estimates a likelihood of the respective action candidates predicted by the action candidate prediction unit 12 and the first action-candidate correction unit 13 in accordance with an estimated reaching time of each of the host vehicle 51 and the other vehicle 52. The second action-candidate correction unit 15 estimates the likelihood of the respective action candidates while taking account of the condition in the blind spot area 55 which can be detected by the host vehicle 51, but cannot be detected by the other vehicle 52. For example, when an object is present in the blind spot area 55, the second action-candidate correction unit 15 estimates the likelihood of the action candidates that the other vehicle 52 would take, in accordance with the object present in the blind spot area 55. In particular, the second action-candidate correction unit 15 first determines whether there is any object in the blind spot area 55. When an object is determined to be present in the blind spot area 55, the second action-candidate correction unit 15 can estimate that the other vehicle 52 would take an action without recognizing the presence of the object in the blind spot area 55, since the other vehicle 52 cannot see the state in the blind spot area 55. The second action-candidate correction unit 15 predicts, based on this estimation, the intention of action that the other vehicle 52 would take when the other vehicle 52 does not recognize the object present in the blind spot area 55, so as to estimate the likelihood of the respective action candidates having been predicted.

For example, the second action-candidate correction unit 15 estimates the likelihood as to which one of the host vehicle 51 and the other vehicle 52 should pass by the parked vehicles (53, 54a, and 54b) first in the traveling situation shown in FIG. 4.

If the condition in the blind spot area 55 is not taken into consideration, the presumed time T1s that the host vehicle 51 needs to reach the parked vehicle 54b is shorter than the presumed time T2s that the other vehicle 52 needs to reach the parked vehicle 53. The second action-candidate correction unit 15 would then determine that the host vehicle 51 can pass by the parked vehicles prior to the other vehicle 52, and inaccurately estimates the likelihood such that the action candidate is high that the other vehicle 52 would take to make a stop in front of the parked vehicle 53 (FIG. 5B), and also estimates the likelihood such that the action candidate is low that the other vehicle 52 would take to overtake the parked vehicles prior to the action of the host vehicle 51.

When the condition in the blind spot area 55 is taken into consideration, the other vehicle 52 is presumed to take an action without recognizing the presence of the parked vehicles (54a and 54b). In particular, the other vehicle 52 is presumed to wrongly determine that the other vehicle 52 should pass by the objects prior to the host vehicle 51, since the presumed time T1s' that the host vehicle 51 needs to reach the parked vehicle 53 is longer than the presumed time T2s. The second action-candidate correction unit 15 thus predicts the likelihood such that the action candidate is high that the other vehicle 52 would take to deviate to enter the lane in which the host vehicle is traveling, as shown in FIG. 5A. Namely, the second action-candidate correction unit 15 estimates the likelihood in which the action candidate shown in FIG. 5A is higher than the action candidate shown in FIG. 5B.

The second action-candidate correction unit 15 thus estimates the likelihood of the action candidates that the other vehicle 52 would take while taking account of not only the estimated reaching time of each of the host vehicle 51 and the other vehicle 52 but also the condition in the blind spot area 55. If the determination of the likelihood is based only on the objects detected by the host vehicle 51, the other vehicle 52 is presumed to take an action of allowing the host vehicle 51 to move ahead, which leads the host vehicle 51 to pass by the parked vehicles (53, 54a, and 54b) prior to the other vehicle 52. However, the other vehicle 52 could have determined to take an action only based on the object detected by the other vehicle 52. In such a case, the other vehicle 52 determines that the host vehicle 51 should yield the way to the other vehicle 52 so as to let the other vehicle 52 pass by the parked vehicles (53, 54a, and 54b) prior to the host vehicle 51. If the other vehicle 52 passes by the parked vehicles (53, 54a, and 54b) prior to the host vehicle 51, the host vehicle 51 needs to suddenly change its behavior to take the action of avoiding the other vehicle 52. The second action-candidate correction unit 15 thus estimates the likelihood of the action candidates in accordance of the object which can be detected by the other vehicle 52 when there are objects in the blind spot area 55 from the other vehicle 52.

Figure 5C:
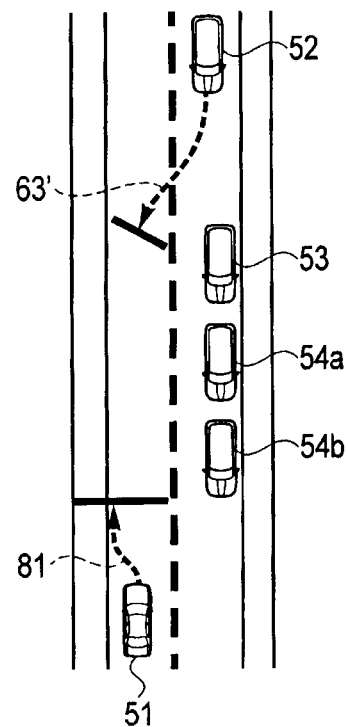
FIG. 5C is a zenith view of the traveling situation shown in FIG. 4 in which the other vehicle 52 first deviates from the oncoming lane to enter the traveling lane of the host vehicle 51 in order to overtake the parked vehicle 53, but then decelerates and stops when recognizing the presence of a parked vehicle 54b.

When the course of the object present in the blind spot arear 55 is predicted by the obstructed object course prediction unit 14, the first action-candidate correction unit 13 adds an action candidate that the other vehicle 52 would take, in accordance with the course of the obstructed object. The second action-candidate correction unit 15 thus can predict the likelihood of the action candidates that the other vehicle 52 would take in accordance with the course of the obstructed object. For example, when the parked vehicle 54b is predicted to take the starting action in the traveling situation shown in FIG. 4, the other vehicle 52 can detect the parked vehicle 54b, which comes out of the blind spot area 55 once it has started moving. In this case, the first action-candidate correction unit 13 adds an action candidate (an intention of action and a primary course 63') of the other vehicle 52 that would first deviate to enter the lane in which the host vehicle 51 is traveling to overtake the parked vehicle 53, but then suddenly decelerate to make a stop since the other vehicle 52 recognizes the presence of the parked vehicle 54b, as shown in FIG. 5C. The second action-candidate correction unit 15 then sets the likelihood such that the added action candidate is higher than the action candidates (63 and 64) shown in FIG. 5A and FIG. 5B.

Further, in the traveling situation shown in FIG. 4, the first action-candidate correction unit 13 can add the action candidate (the intention of action and the primary course 63') of the other vehicle 52 shown in FIG. 5C also when the parked vehicles (53, 54a, and 54b) are all stationary objects. The reason for this is that the other vehicle 52 can detect the parked vehicle 54b when deviating toward the lane in which the host vehicle 51 is traveling for overtaking the parked vehicle 53.

The course prediction unit 16 predicts a course (effective course) that the other vehicle 52 follows, in accordance with the behavior detected by the behavior determination unit 11. In particular, the course prediction unit 16 calculates the effective course when the other vehicle 52 is presumed to take an action based on the intention of action predicted, by a conventional state estimation method such as Kalman filtering. As used herein, the term "effective course" encompasses profiles of positions of the other vehicle 52 at different times, and also profiles of velocities of the other vehicle 52 at the respective positions, as in the case of the primary course. The effective course and the primary course are common in that the other vehicle 52 would follow, but differ from each other in that the effective course is calculated in view of the behavior of the other vehicle 52, while the primary course is calculated without consideration of the behavior of the other vehicle 52.

Figure 9A:
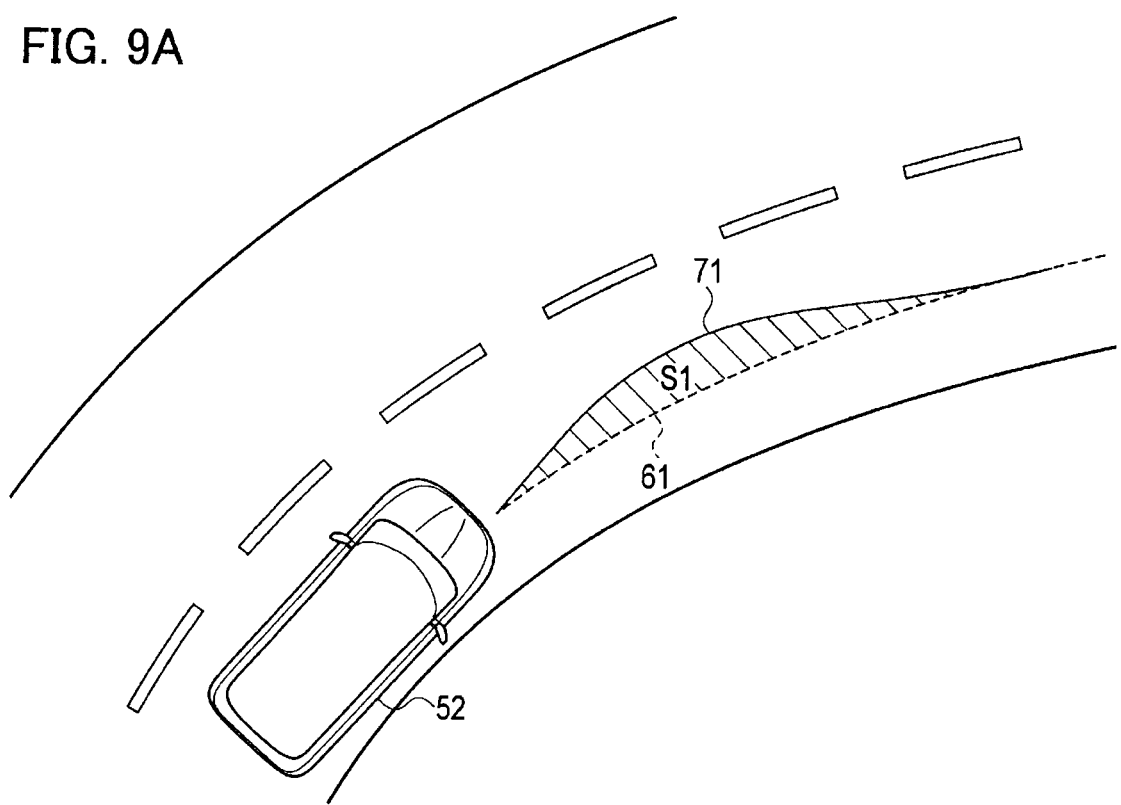
FIG. 9A is a zenith view illustrating a primary course (forward movement) 61 and an effective course (forward movement) 71 of the other vehicle 52 traveling on a two-lane curved road.
Figure 9B:
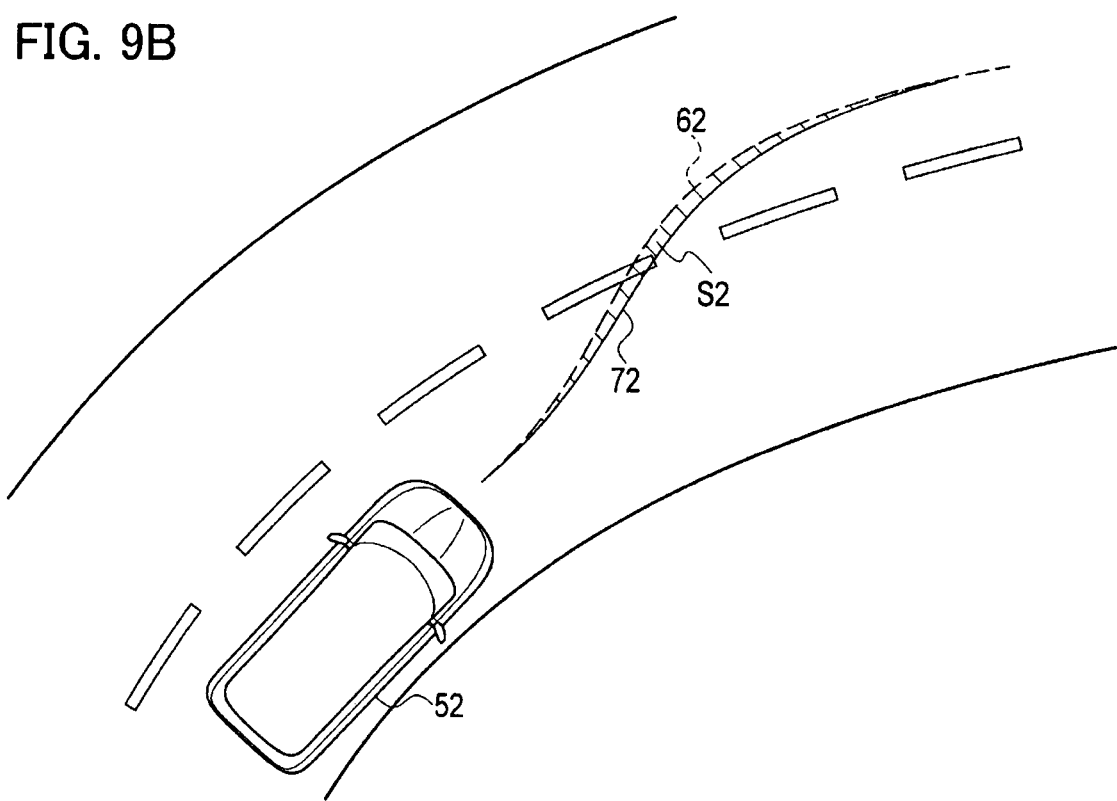
FIG. 9B is a zenith view illustrating a primary course (lane change) 62 and an effective course (lane change) 72 of the other vehicle 52 traveling on the two-lane curved road.

FIG. 9A and FIG. 9B illustrate the primary courses (61 and 62) of the other vehicle 52 calculated according to the intention of action and the road structure without the behavior of the other vehicle 52 taken into consideration. Since the current attitude (yaw angle) of the other vehicle 52, for example, is not taken into consideration, the respective primary courses (61 and 62) extend in different directions from the current position of the other vehicle 52. The course prediction unit 16 then takes account of the behavior of the other vehicle 52 to calculate the course (effective course) corresponding to the intention of action described above. Namely, the course prediction unit 16 calculates the effective course when the other vehicle 52 is presumed to take an action corresponding to the intention of action described above.

FIG. 5A, FIG. 5B, FIG. 5C, FIG. 7A, and FIG. 7B also illustrate the primary courses (63, 63', 64, 65, and 66) of the other vehicle 52 each calculated according to the intention of action of the other vehicle 52 and the road structure.

The attitude (yaw angle) of the other vehicle 52 illustrated in FIG. 9A and FIG. 9B inclines to the left from the primary course 61 of the other vehicle 52 following the traveling lane. The velocity of the other vehicle 52 only has a velocity component in the traveling direction, and the velocity component in the vehicle width direction is zero. The other vehicle 52 is thus in the state of making a forward movement. When the other vehicle 52 is traveling in accordance with the intention of action of following the traveling lane on the basis of the above attitude and velocity, the other vehicle 52 travels along an effective course 71 which starts leaving the primary course 61 toward the left and then returns to finally conform to the primary course 61, as shown in FIG. 9A. In other words, the other vehicle 52 is presumed to follow a corrected course (overshoot course) generated such that the deviation from the traveling lane is corrected. The course prediction unit 16 thus predicts the effective course 71 conforming to the intention of action of following the traveling lane (forward movement) on the basis of the attitude (yaw angle) and the velocity of the other vehicle 52.

When the other vehicle 52 is traveling in accordance with the intention of action of changing the lanes on the basis of the same attitude and velocity, the other vehicle 52 travels along an effective course 72 which starts turning in the left direction to be shifted to the left lane, and then makes a slight turn toward the right to correct the direction so as to follow the left lane, as illustrated in FIG. 9B. Namely, the effective course 72 generated includes a left-turn clothoid curve and a right-turn clothoid curve starting from a state in which the steering angle is in a neutral position. The effective course 72 is thus used for the lane change which takes substantially the same time as the "predetermined period of lane-change time" used for the calculation of the lane-change course 62. The curves used when the effective course is generated are not necessarily the clothoid curves, and may be any other curves. As shown in FIG. 9B, the effective course 72 has substantially the same configuration as the primary course 62 for changing the lanes.

The course prediction unit 16 calculates the course corresponding to the intention of action (effective course) while taking account of the behavior of the other vehicle 52 as to the respective primary courses (63, 63', 64, 65, and 66) shown in FIG. 5A, FIG. 5B, FIG. 5C, FIG. 7A, and FIG. 7B, in the same manner as FIG. 9A and FIG. 9B. For example, the course prediction unit 16 calculates the effective course for the other vehicle 52 conforming to the intention of action of deviating from its traveling lane or making a stop on the basis of the attitude (yaw angle) and the velocity of the other vehicle 52.

Although this case takes account of the attitude and the velocity as examples of the behavior of the other vehicle 52, the position, the acceleration, and the deceleration of the other vehicle 52 may be calculated instead. For example, the deceleration upon the lane change can be presumed to be greater than the case of the forward movement.

The likelihood estimation unit 17 compares each action candidate predicted by the action candidate prediction unit 12 and the first action-candidate correction unit 13 with the behavior of the other vehicle 52 integrated by the detection integration unit 2a, so as to predict the action of the other vehicle 52. The likelihood estimation unit 17 further predicts the action of the other vehicle 52 in view of the likelihood predicted by the second action-candidate correction unit 15.

In particular, the likelihood estimation unit 17 compares the primary course with the effective course for each of the action candidates predicted by the action candidate prediction unit 12 and the first action-candidate correction unit 13. The likelihood estimation unit 17 then calculates a likelihood of the respective action candidates based on the difference between the primary course and the effective course. The likelihood calculated is higher as the difference between the primary course and the effective course is smaller.

The likelihood estimation unit 17 further weights the likelihood of the respective action candidates according to the likelihood predicted by the second action-candidate correction unit 15. For example, the likelihood estimation unit 17 multiplies the likelihood of the respective action candidates by the likelihood predicted by the second action-candidate correction unit 15 used as a coefficient. This calculation can integrate the likelihood predicted by the second action-candidate correction unit 15 with the likelihood estimated by the likelihood estimation unit 17. For example, the likelihood estimation unit 17 multiplies the likelihood of the action candidate 63 of deviating from the traveling lane as shown in FIG. 5A by a greater coefficient than the likelihood of the action candidate 64 of making a stop as shown in FIG. 5B.

The action candidate with the highest likelihood can be determined to be the most reasonable when the behavior of the other vehicle 52 and the condition in the blind spot area 55 are taken into consideration. The likelihood estimation unit 17 then determines that the action candidate estimated to have the highest likelihood is the action that the other vehicle 52 takes. The difference between the primary course and the effective course is computed according to the sum of differences between the positions of the respective courses or the profiles of the velocities, for example. FIG. 9A and FIG. 9B illustrate the areas S1 and S2, each being a sum obtained by the integration of positional differences between the primary course and the effective course. The positional difference can be determined to be smaller as the area is smaller, so that a higher likelihood is obtained. As another example, when the positional differences are small but the profiles of the velocities greatly differ, a smaller likelihood is obtained. The likelihood is an example of an index indicating the possibility that the action candidate results in being true, and any other indication may be used instead of the likelihood.

The likelihood estimation unit 17 also compares the primary course with the effective course for each of the action candidates (63, 64, and 63') as shown in FIG. 5A to FIG. 5C to calculate the likelihood, and multiplies the calculated likelihood by the coefficient (the likelihood predicted by the second action-candidate correction unit 15). The likelihood estimation unit 17 then determines that the action candidate (63, 64, or 63') estimated to have the highest likelihood is the action that the other vehicle 52 takes.

As described above, the action prediction unit 10 predicts the action of the other vehicle 52 in accordance with the likelihood of the respective action candidates estimated by the likelihood estimation unit 17. The term "action of the other vehicle" encompasses the profiles of the course and the velocity of the other vehicle. The course of the other vehicle 52 refers to the profiles of the positions of the other vehicle 52 at different times.

The host-vehicle route generation unit 21 generates a route of the host vehicle 51 based on the action of the other vehicle 52 predicted by the action prediction unit 10. When the action prediction unit 10 predicts the action 63 of the other vehicle 52 shown in FIG. 5A, a route 81 of the host vehicle 51 can be generated on the presumption that the other vehicle 52 deviates from the traveling lane. The host vehicle 51 follows the route 81 such that the host vehicle 51 moves closer to the edge of the road and then stops in front of the parked vehicle 54*b*. The host-vehicle route generation unit 21 thus can generate the route that the host vehicle 51 can follow smoothly while avoiding a collision with the other vehicle 52 and avoiding sudden deceleration or quick steering required in response to the behavior of the other vehicle 52. The term "route of the host vehicle 51" encompasses profiles of positions of the host vehicle 51 at different times, and also profiles of velocities of the host vehicle 51 at the respective positions.

This embodiment predicts the action of the other vehicle 52 including the course of the other vehicle 52 according to the behavior of the other vehicle 52 on the map. The route generation for the host vehicle 51 based on the course of the other vehicle 52 thus corresponds to the route generation based on a change in relative distance to the other vehicle 52, acceleration or deceleration, or a difference in attitude angle.

For example, when the other vehicle 52 stays in the traveling lane and starts decelerating, as shown in FIG. 5B, the behavior of the other vehicle 52 can be presumed to indicate that the other vehicle 52 is willing to yield the way to the host vehicle 51 to let the host vehicle 51 move ahead. In this case, the route of the host vehicle 51 is generated, or the host vehicle 51 is controlled in view of the intention of action of the other vehicle 52, so that the host vehicle 51 can keep going without deceleration, or can accelerate so as to pass by the parked vehicles (53, 54*a*, and 54*b*) prior to the other vehicle 52. This control can avoid the situation in which the host vehicle 51 and the other vehicle 52 yield the way to each other, so as to facilitate the flow of traffic accordingly.

The vehicle control unit 22 drives at least one of a steering actuator, an acceleration pedal actuator, and a deceleration pedal actuator in accordance with its position calculated by the position-in-map calculation unit 5 so that the host vehicle 51 travels to follow the route generated by the host-vehicle route generation unit 21. While the embodiment is illustrated with the case in which the host vehicle 51 is controlled in accordance with the generated route, the host vehicle 51 may be controlled regardless of the generation of the route of the host vehicle 51. In such a case, the host vehicle 51 can be controlled according to the relative distance to the other vehicle 52 or a difference in the attitude angle between the other vehicle 52 and the host vehicle 51.

Figure 1:
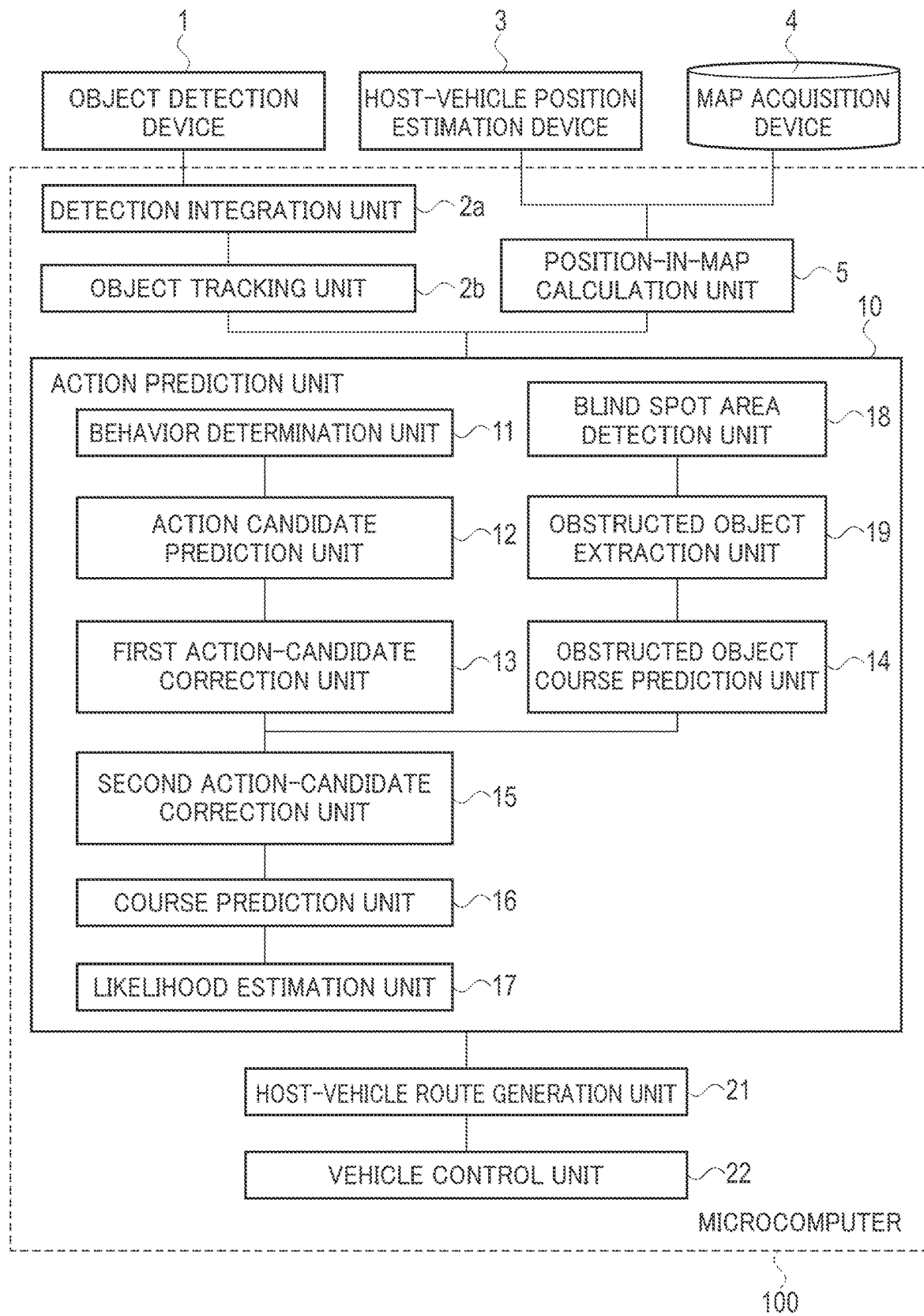
FIG. 1 is a block diagram showing a configuration of a traveling assistance device and an action prediction device according to an embodiment.

A traveling assistance method using the traveling assistance device shown in FIG. 1 is described below with reference to FIG. 2 and FIG. 3. The microcomputer 100 shown in FIG. 1 may be used to function as an action prediction device for predicting the action of the other vehicle 52, so as to implement the traveling assistance method of finally outputting the result of a processing operation shown in step S06 in FIG. 2.

First, in step S01, the object detection device 1 detects behavior of objects around the host vehicle 51 by the respective object detection sensors. The process proceeds to step S02, and the detection integration unit 2*a* integrates a plurality of detection results obtained by the plural object detection sensors, and outputs a single detection result per object. The object tracking unit 2*b* tracks each object detected and integrated.

The process proceeds to step S03, and the host-vehicle position estimation device 3 measures the position, the attitude, and the velocity of the host vehicle 51 on the basis of a predetermined reference point by use of the position detection sensor. The process proceeds to step S04, and the map acquisition device 4 acquires the map information indicating the structure of the road on which the host vehicle 51 is traveling.

The process proceeds to step S05, and the position-in-map calculation unit 5 estimates the position and the attitude of the host vehicle 51 on the map according to the position of the host vehicle 51 measured in step S03 and the map data acquired in the step S04. The process proceeds to step S06, and the action prediction unit 10 predicts the action of the other vehicle 52 around the host vehicle 51 in accordance with the detection result (the behavior of the other vehicle 52) obtained in step S02 and the position of the host vehicle 51 specified in step S05.

The process in step S06 is described in more detail below with reference to FIG. 3. In step S611, the behavior determination unit 11 determines the road on which the other vehicle is traveling and its traveling lane of the road according to the position of the host vehicle 51 on the map, and the behavior of the object acquired in step S02. The process proceeds to step S612, and the action candidate prediction unit 12 predicts the action candidate of the other vehicle 52 based on the map. For example, the action candidate prediction unit 12 predicts the intention of action according to the road structure.

Figure 7A:
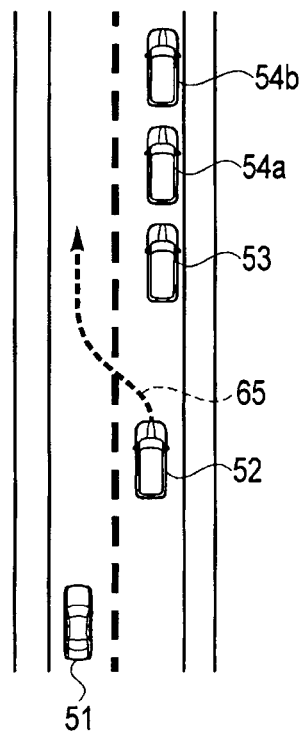
FIG. 7A is a zenith view of the traveling situation shown in FIG. 6 in which the other vehicle 52 is deviating from the right lane to enter the left lane.
Figure 7B:
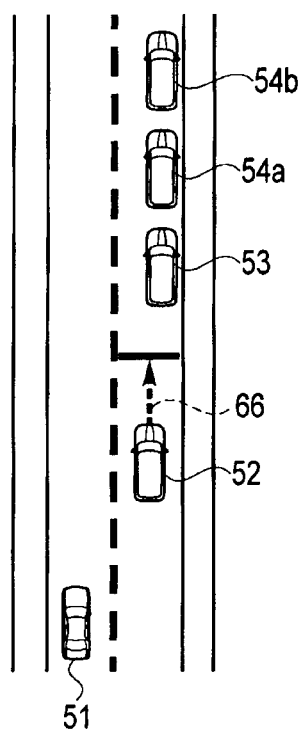
FIG. 7B is a zenith view of the traveling situation shown in FIG. 6 in which the other vehicle 52 makes a stop in front of the parked vehicle 53.

The process proceeds to step S613, and the microcomputer 100 executes the process in steps S611 and S612 for all of the other vehicles detected in step S01. After the process is executed (YES in step S613), the process proceeds to step S614, and the first action-candidate correction unit 13 takes account of a stationary object simultaneously detected in step S01 to correct the action candidate predicted in step S612. For example, the first action-candidate correction unit 13 adds the intention of action and the primary course (63, 65) for deviating from the traveling lane as shown in FIG. 5A, FIG. 5C, or FIG. 7A, or the intention of action and the primary course (64, 66) for making a stop in front of the stationary object as shown in FIG. 5B or FIG. 7B.

The process proceeds to step S615, and when another moving object is detected in step S01 simultaneously with the other vehicle 52, the first action-candidate correction unit 13 takes account of the other moving object to correct the action candidate predicted in step S612. For example, when the starting action of the parked vehicle 54*b* is detected, the first action-candidate correction unit 13 adds the action candidate (the intention of action and the primary course 63') as shown in FIG. 5C.

The process proceeds to step S616, and the blind spot area detection unit 18 determines whether the blind spot area 55 from the other vehicle 52 is caused by any object detected in step S01. When the blind spot area 55 is caused (YES in step S616), the process proceeds to step S617, and the obstructed object extraction unit 19 extracts objects (obstructed objects) present in the blind spot area 55 among the objects detected by the detection integration unit 2a. In the traveling situation shown in FIG. 4, the obstructed object extraction unit 19 extracts the parked vehicles (54a and 54b) present in the blind spot area 55 as obstructed objects. The process proceeds to step S618, and when the obstructed objects are moving objects, the blind spot area detection unit 14 predicts the course of each object present in the blind spot area 55 in accordance with the behavior of the corresponding object.

The process proceeds to step S619, and the second action-candidate correction unit 15 estimates the likelihood of the respective action candidates predicted by the action candidate prediction unit 12 and the first action-candidate correction unit 13 according to the estimated reaching time of each of the host vehicle 51 and the other vehicle 52. The second action-candidate correction unit 15 estimates the likelihood of the respective action candidates while taking account of the condition in the blind spot area 55 which can be detected by the host vehicle 51, but cannot be detected by the other vehicle 52. In the traveling situation shown in FIG. 4, the second action-candidate correction unit 15 estimates the likelihood as to which one of the host vehicle 51 and the other vehicle 52 should pass by the parked vehicles (53, 54a, and 54b) first, based on the parked vehicles (54a and 54b) present in the blind spot area 55. The process then proceeds to step S620.

When the blind spot area is not caused (NO in step S616), the process proceeds to step S620. The microcomputer 100 executes the process from steps S614 to S619 for all of the other vehicles detected in step S01. After the process is executed (YES in step S620), the process proceeds to step S621, and the course prediction unit 16 calculates the effective course (71, 72, refer to FIG. 9A and FIG. 9B) of the other vehicle 52 when the other vehicle 52 keeps its behavior and is presumed to take an action based on the intention of action predicted, by a conventional state estimation method such as Kalman filtering.

The process proceeds to step S622, and the likelihood estimation unit 17 compares the primary course (61 to 63) with the effective course (71 to 73) for each of the action candidates predicted in steps S612, S614, and S615. The likelihood estimation unit 17 then calculates a likelihood of the respective action candidates based on the difference between the primary course and the effective course. The likelihood estimation unit 17 further weights the likelihood of the respective action candidates in accordance with the likelihood estimated in step S619. The likelihood estimation unit 17 determines that the action candidate estimated to have the highest likelihood is the action that the other vehicle 52 takes.

The process proceeds to step S623, and the microcomputer 100 executes the process from steps S621 to S622 for all of the other vehicles detected in step S01. The specific process in step S06 shown in FIG. 2 thus ends.

Figure 2:
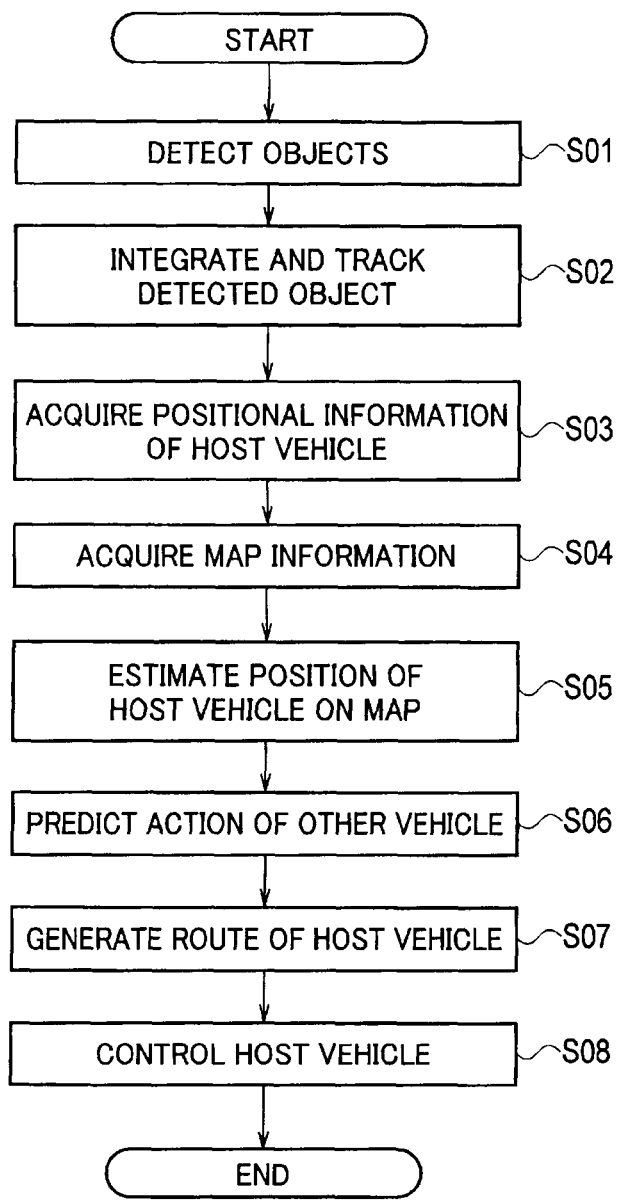
FIG. 2 is a flowchart showing an example of an operation of the traveling assistance device and the action prediction device shown in FIG. 1.
Figure 3:
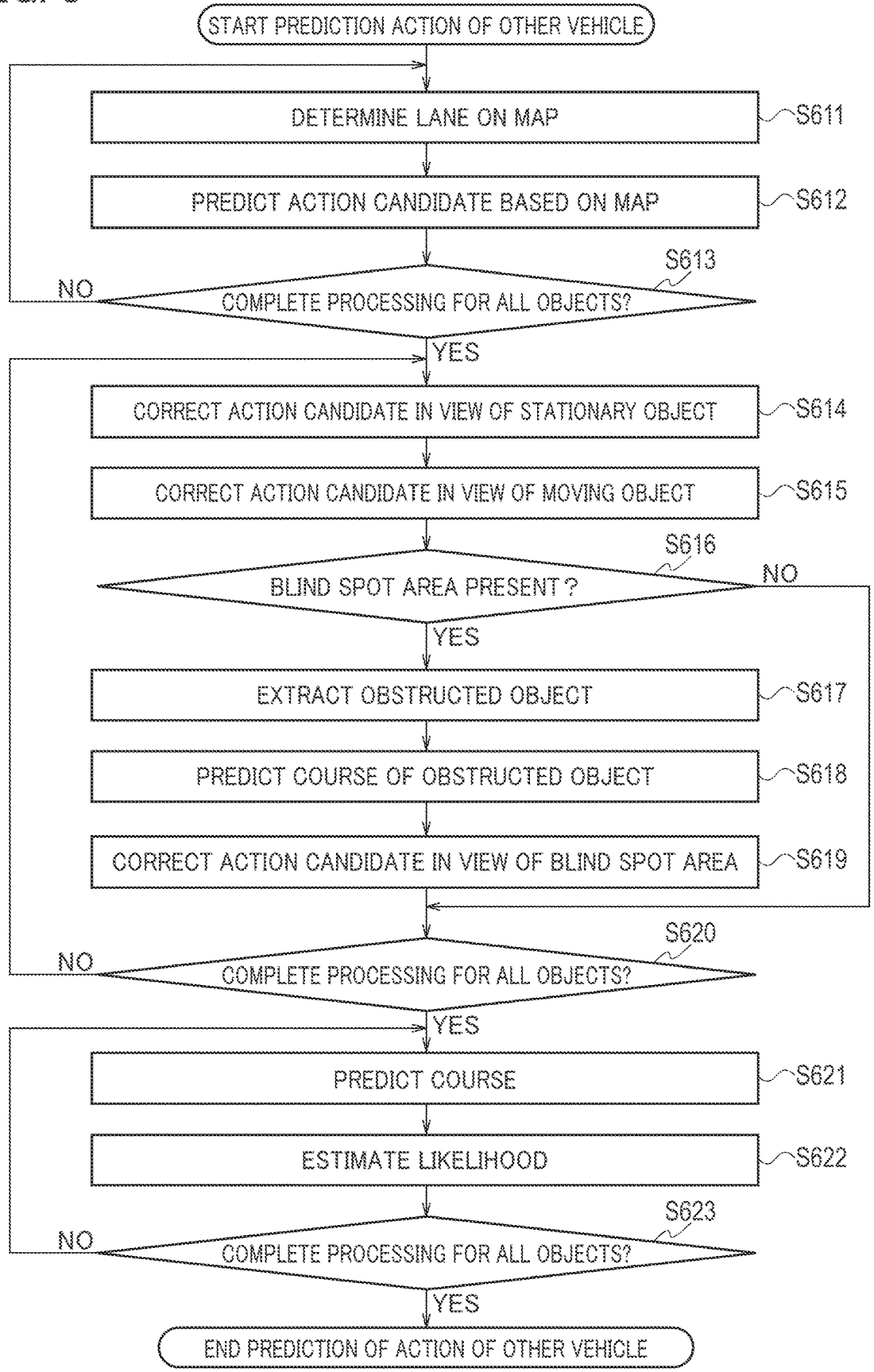
FIG. 3 is a flowchart showing a specific process in step S06 shown in FIG. 2.

The process proceeds to step S07 shown in FIG. 2, and the host-vehicle route generation unit 21 generates a route of the host vehicle 51 based on the action of the other vehicle predicted in step S06. The process proceeds to step S08, and the vehicle control unit 22 controls the host vehicle 51 so as to lead the host vehicle 51 to travel to follow the route generated in step S07. The present embodiment is illustrated with the case in which the prediction results of the other vehicle are reflected in the course of the host vehicle, but is not limited to this case. The prediction results may be reflected in various kinds of control regarding the behavior of the host vehicle, such as the velocity, the acceleration, the rotational angular velocity, the profiles of these elements after a predetermined time, steering control, driving control, and braking control, so as to execute each control.

Figure 6:
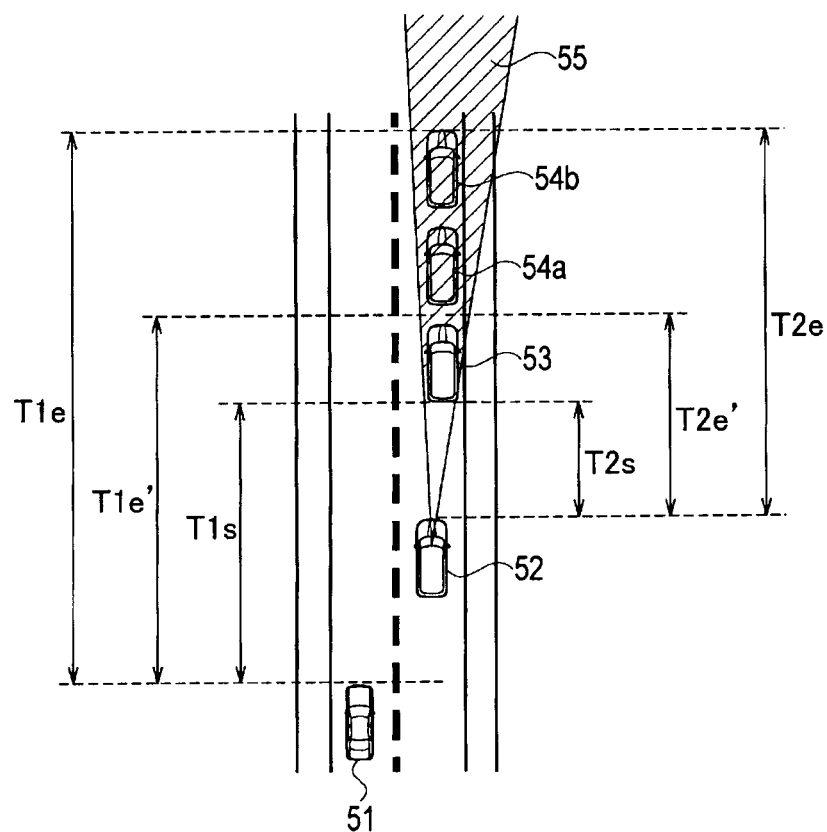
FIG. 6 is a zenith view illustrating a traveling situation on a two-lane, one-way road in which the host vehicle 51 is traveling in the left lane, and the other vehicle 52 is traveling in the right lane obliquely ahead of the host vehicle 51.
Figure 8:
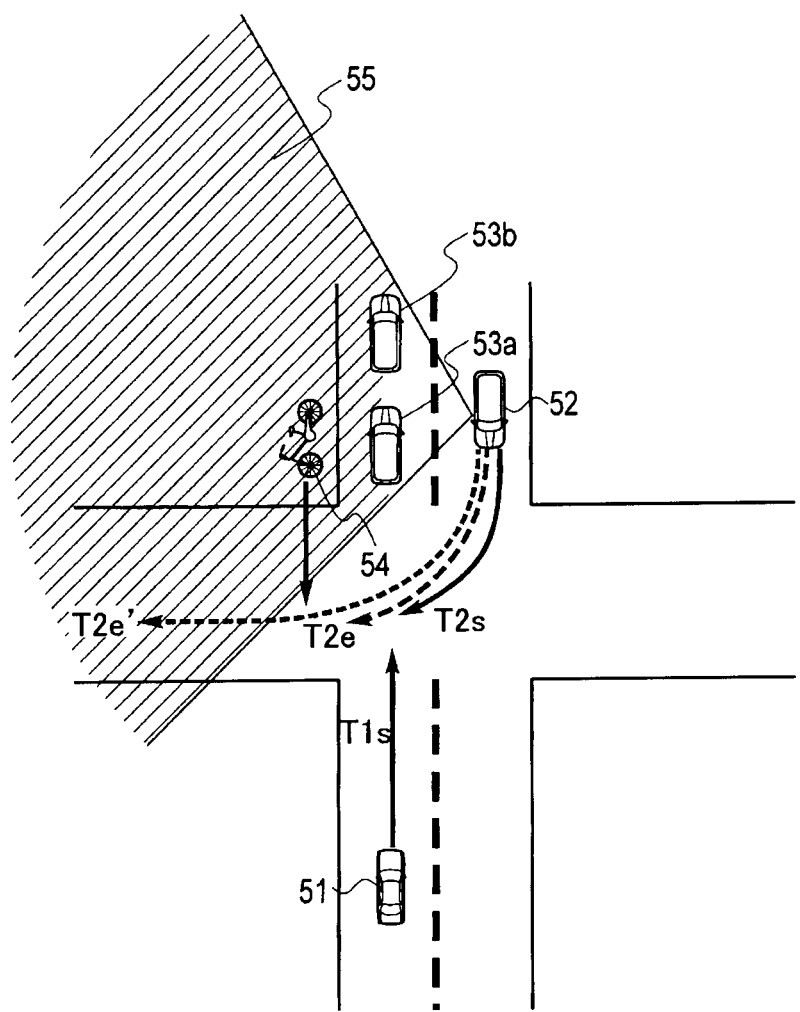
FIG. 8 is a zenith view illustrating a traveling situation in which the host vehicle 51 and the other vehicle 52 are traveling in the respective lanes on a two-lane oncoming road toward an intersection.

The present embodiment is effective not only in the traveling situation shown in FIG. 4, but also in the traveling situations shown in FIG. 6 and FIG. 8.

FIG. 6 illustrates a case in which the host vehicle 51 is traveling in the left lane on a two-lane, one-way road, and the other vehicle 52 is traveling alongside on the right lane obliquely ahead of the host vehicle 51. The other vehicle 52 in this case is also referred to as a parallel-traveling vehicle. A plurality of parked vehicles (53, 54a, and 54b) are stopping in line in the right lane in front of the other vehicle 52. Since the host vehicle 51 and the other vehicle 52 cannot simultaneously pass by the plural parked vehicles (53, 54a, and 54b), either the host vehicle 51 or the other vehicle 52 needs to yield the way to the other to let it move ahead first, as in the traveling situation shown in FIG. 4. The host vehicle 51 has priority on this road over the other vehicle 52.

The other vehicle 52 can detect the closest parked vehicle 53. This parked vehicle 53 causes the blind spot area 55 from the other vehicle 52. When the other parked vehicles (54a and 54b) are included in the blind spot area 55, the other vehicle 52 cannot detect these parked vehicles (54a and 54b). The host vehicle 51 traveling in the left lane can detect all of the parked vehicles (53, 54a, and 54b) present in the adjacent right lane.

In the traveling situation shown in FIG. 6, the time (T1s, T2s) that each of the host vehicle 51 and the other vehicle 52 needs to reach the closest parked vehicle 53 does not vary depending on whether to take account of the condition in the blind spot area 55. In contrast, the time that each of the host vehicle 51 and the other vehicle 52 needs to pass by the farthest parked vehicle 54b varies depending on whether to take account of the condition in the blind spot area 55. The host vehicle 51 can compare the presumed time T1e that the host vehicle 51 needs to pass by the parked vehicle 54b with the presumed time T2e that the other vehicle 52 needs to pass by the parked vehicle 54b. However, the other vehicle 52 incorrectly compares the presumed time T1e' that the host vehicle 51 needs to pass by the parked vehicle 53 with the presumed time T2e' that the other vehicle 52 needs to pass by the parked vehicle 53. The incorrect comparison may cause the other vehicle 52 to wrongly determine to move ahead first, which would lead the other vehicle 52 to deviate toward the left lane in which the host vehicle 51 is traveling, as illustrated in FIG. 7A.

The second action-candidate correction unit 15 thus takes account of the condition in the blind spot area 55 so as to estimate the likelihood such that the action candidate 65 (FIG. 7A) that the other vehicle 52 would take to pass by the parked vehicles (53, 54a, and 54b) first is higher than the action candidate 66 (FIG. 7A) that the host vehicle 51 would take to pass by the parked vehicles (53, 54a, and 54b) first. The action candidate 66 is that the other vehicle 52 would take to make a stop in front of the parked vehicle 53. The action candidate 65 is that the other vehicle 52 would take to deviate to enter the left lane in which the host vehicle 51 is traveling.

Although not shown, the second action-candidate correction unit 15 may additionally predict an action candidate of the other vehicle 52 that would first deviate to enter the lane in which the host vehicle 51 is traveling so as to overtake the parked vehicle 53, but then decelerate and make a stop when the other vehicle 52 recognizes the presence of the other parked vehicles (54*a* and 54*b*).

FIG. 8 illustrates a case in which the host vehicle 51 and the other vehicle 52 are traveling in opposite directions toward an intersection on a two-lane oncoming road. The host vehicle 51 is traveling in its traveling lane, and the other vehicle 52 is traveling in the oncoming lane in the opposite direction. The other vehicle 52 shows the intention of turning to the right at the intersection by turning on the directional signal indicating the right turn, for example. The host vehicle 51 and the other vehicle 52 cannot simultaneously go through the intersection, and either the host vehicle 51 or the other vehicle 52 needs to yield the way to the other to let it move ahead first. The host vehicle 51 has priority on this road over the other vehicle 52. Two preceding vehicles (53*a* and 53*b*) are traveling alongside the other vehicle 52 ahead of the host vehicle 51. A bicycle 54 intending to cross the intersection is present alongside the two preceding vehicles (53*a* and 53*b*).

The other vehicle 52 can detect the preceding vehicles (53*a* and 53*b*). These preceding vehicles (53*a* and 53*b*) cause a blind spot area 55 from the other vehicle 52. When the bicycle 54 is included in the blind spot area 55, the other vehicle 52 cannot detect the bicycle 54. The host vehicle 51 can detect the bicycle 54 in this situation.

The time (T1$s$, T2$s$) that each of the host vehicle 51 and the other vehicle 52 needs to reach the intersection does not vary depending on whether to take account of the condition in the blind spot area 55 also in the traveling situation shown in FIG. 8. However, the time that each of the host vehicle 51 and the other vehicle 52 needs to go through the intersection varies depending on whether to take account of the condition in the blind spot area 55. The host vehicle 51 recognizing the presence of the bicycle 54 presumes a relatively long period of time (T2$e$) that the other vehicle 52 needs to go through the intersection, since the other vehicle 52 needs to wait for the bicycle 54 to cross the intersection. However, the other vehicle 52 would presume a relatively short period of time (T2$e'$) necessary for its action because the other vehicle 52 fails to recognize the presence of the bicycle 54 in the blind spot area 55. The other vehicle 52 thus may incorrectly compare the presumed time T1$e$ with the presumed time T2$e'$. The incorrect comparison can lead the other vehicle 52 to wrongly determine that the other vehicle 52 should move ahead first to enter the intersection prior to the host vehicle 51.

When the other vehicle 52 detects the bicycle 54, the other vehicle 52 can determine whether to start making a right turn while taking account of the timing of action between the other vehicle 52 and the host vehicle 51 and the timing of action between the other vehicle 52 and the bicycle 54. When the other vehicle 52 does not detect the bicycle 54, the other vehicle 52 would inaccurately determine whether to start making a right turn only in view of the timing of action between the other vehicle 52 and the host vehicle 51 without taking account of the timing of action between the other vehicle 52 and the bicycle 54.

The second action-candidate correction unit 15 thus takes account of the bicycle 54 present in the blind spot area 55 so as to estimate the likelihood such that the action candidate that the other vehicle 52 would take to enter the intersection first is higher than the action candidate that the host vehicle 51 would take to enter the intersection first. This enables the host vehicle 51 to travel smoothly while avoiding sudden deceleration or quick steering.

The second action-candidate correction unit 15 may additionally predict an action candidate of the other vehicle 52 that would first enter the intersection so as to turn to the right, but then decelerate and make a stop (not shown) when the other vehicle 52 recognizes the presence of the bicycle 54 crossing the intersection, as in the case of the traveling situations shown in FIG. 4 and FIG. 6.

As described above, the embodiment can achieve the following effects.

The microcomputer 100 (an example of a controller) sets the blind spot area 55 from the other vehicle 52 on the map, specifies an object present in the blind spot area 55 among objects detected by the object detection sensors, and predicts the action that the other vehicle 52 would take, in accordance with the specified object. The microcomputer 100 thus can accurately predict the action of the other vehicle 52 based on an object that the other vehicle 52 can detect when there is any object in the blind spot area 55 from the other vehicle 52.

The microcomputer 100 may predict the action of the other vehicle 52 depending on the behavior of an object present in the blind spot area 55. The microcomputer 100 thus can predict the action of the other vehicle 52 more accurately when the object present in the blind spot area 55 is a moving object.

The microcomputer 100 may set the blind spot area 55 from the other vehicle 52 only in the region with the action candidate that the other vehicle 52 would travel to, in accordance with the position of the other vehicle 52, the traveling direction of the other vehicle 52, and the road structure around the other vehicle 52. This can reduce the calculation load of the microcomputer 100 without a decrease in accuracy of predicting the action of the other vehicle 52, effectively calculating the blind spot area 55 accordingly. The speed of the calculation processing of the microcomputer 100 can also be improved.

The microcomputer 100 may predict the action that the other vehicle 52 would take when there is an object present in the blind spot area 55 that the other vehicle 52 does not recognize. The microcomputer 100 thus can accurately predict the action of the other vehicle 52 based on the object that the other vehicle 52 can detect when there is any object in the blind spot area 55 from the other vehicle 52.

The microcomputer 100 may predict the action candidate that the other vehicle 52 would take when there is an object present in the blind spot area 55 that the other vehicle 52 does not recognize, in accordance with the road structure around the host vehicle 51, and compare the predicted action candidate with the behavior of the other vehicle 52 so as to predict the action of the other vehicle 52. The microcomputer 100 thus can accurately predict the action of the other vehicle 52 based on the object that the other vehicle 52 can detect.

The microcomputer 100 sets a blind spot from an occupant in the other vehicle 52 as the blind spot area 55. The microcomputer 100 thus can precisely estimate the blind spot area 55, so as to accurately predict the operation or behavior (including sudden operation such as sudden braking or quick steering) of the other vehicle 52 caused by the occupant in response to an unexpected object.

The microcomputer 100 sets, as the blind spot area 55, an area excluding the detection area detected by the sensor in the other vehicle 52. This leads to the accurate estimation of the blind spot area 55, so that the microcomputer 100 can accurately predict the behavior (including the course) caused upon the detection of the object in the blind spot area 55 by the other vehicle 52, when the other vehicle 52 capable of autonomous driving control or traveling assistance control (autonomous braking) detects the surrounding circumstances by use of a sensor mounted on the other vehicle 52 to execute the vehicle control depending on the object detected.

The microcomputer 100 controls the host vehicle 51 in accordance with the predicted action of the other vehicle 52. The host vehicle 51 thus can be controlled with the occupant's discomfort reduced, by the autonomous driving control or traveling assistance control (including autonomous braking), including the operation of preliminarily decelerating, moving to the edge of the road, and considering the order of passage of lanes, for example. The preliminary prediction of the action of the other vehicle 52 enables the host vehicle 51 to avoid a sudden change in its behavior such as sudden braking or quick steering, so as to prevent the occupant in the host vehicle 51 from feeling uncomfortable.

The microcomputer 100 generates a route of the host vehicle 51 based on the predicted action of the other vehicle 52, and controls the other vehicle 51 in accordance with the route of the host vehicle 51. The microcomputer 100 thus can control the host vehicle 51 safely with respect to any risk and smoothly while avoiding sudden deceleration or quick steering of the host vehicle 51 caused in response to the behavior of the other vehicle 52.

The microcomputer 100 compares the behavior of the other vehicle 52 with the action candidate that the other vehicle 52 would take, so as to control the host vehicle 51 in accordance with the action candidate of the other vehicle 52 when the behavior of the other vehicle 52 is similar to the action candidate. The host vehicle 51 thus can take appropriate initial action depending on the action of the other vehicle 52 failing to recognize an obstructed object actually present in the blind spot area 55. This can avoid a sudden change in behavior of the host vehicle 51 to prevent the occupant from feeling uncomfortable.

The microcomputer 100 compares the behavior of the other vehicle 52 with the action candidate that the other vehicle 52 would take, so as to control the host vehicle 51 in accordance with the behavior of the other vehicle 52 when the behavior of the other vehicle 52 is not similar to the action candidate. The host vehicle 51 thus can take appropriate initial action based on the actual behavior of the other vehicle 52 regardless of whether there is any obstructed object in the blind spot area 55, so as to avoid a sudden change in behavior of the host vehicle 51 to prevent the occupant from feeling uncomfortable.

While the present invention has been described above by reference to the embodiment, it should be understood that the present invention is not intended to be limited to the above descriptions, and various alternatives and modifications will be apparent to those skilled in the art.

While the above embodiment has been illustrated with the case in which the host vehicle 51 is in an autonomous driving mode capable of autonomous traveling, the host vehicle 51 may be in a manual driving mode operated by the driver of the host vehicle 51. In such a case, the microcomputer 100 may control, for the operation of the host vehicle 51 (for driving support), a speaker, a display, and a user interface thereof for guiding the driver in operating the steering wheel, the accelerator, and the brake by use of voice or images.

REFERENCE SIGNS LIST

OBJECT DETECTION DEVICE (OBJECT DETECTION SENSOR)
51 HOST VEHICLE
52 OTHER VEHICLE
53 PARKED VEHICLE (OBJECT)
53*a*, 53*b* PRECEDING VEHICLE (OBJECT)
54 BICYCLE (OBJECT IN BLIND SPOT AREA)
54*a*, 54*b* PARKED VEHICLE (OBJECT IN BLIND SPOT AREA)
55 BLIND SPOT AREA
100 MICROCOMPUTER (CONTROLLER)

The invention claimed is:

1. A traveling assistance method for predicting an action of another vehicle around a host vehicle to assist the host vehicle in traveling according to a predicted result, the method comprising:
   detecting, by an object detection sensor, the other vehicle and objects around the host vehicle;
   predicting, by a processor, an action candidate that the other vehicle takes based on a map;
   setting, by the processor, a blind spot area that is a blind spot from the other vehicle based on positions of the detected objects, wherein the blind spot area is caused by the detected objects;
   specifying, by the processor, an obstructed object by extracting an object present in the blind spot area among the detected objects;
   estimating, by the processor, a likelihood of the action candidate in accordance with the specified obstructed object;
   predicting, by the processor, an action that the other vehicle takes in accordance with the estimated likelihood; and
   utilizing, by the processor, the predicted action that the other vehicle takes.

2. The traveling assistance method according to claim 1, further comprising:
   estimating, by the processor, the likelihood of the action candidate in accordance with a behavior of the specified obstructed object present in the blind spot area.

3. The traveling assistance method according to claim 1, further comprising:
   setting, by the processor, the blind spot area only in a region with a probability that the other vehicle is to travel to, in accordance with a position of the other vehicle, a traveling direction of the other vehicle, and a road structure around the other vehicle.

4. The traveling assistance method according to claim 1, further comprising:
   predicting, by the processor, the action that the other vehicle takes when there is the specified obstructed object present in the blind spot area that the other vehicle fails to recognize.

5. The traveling assistance method according to claim 4, further comprising:
   predicting, by the processor, the action candidate that the other vehicle takes when the other vehicle fails to recognize the specified obstructed object present in the blind spot area, in accordance with a road structure around the host vehicle; and
   comparing, by the processor, a behavior of the other vehicle with the action candidate so as to predict the action of the other vehicle.

6. The traveling assistance method according to claim 1, further comprising:
   setting, by the processor, a blind spot from an occupant in the other vehicle as the blind spot area.

7. The traveling assistance method according to claim 1, further comprising:
   setting, by the processor, an area excluding a detection area detected by a sensor in the other vehicle as the blind spot area.

8. The traveling assistance method according claim 1, further comprising:
  controlling, by the processor, the host vehicle in accordance with the predicted action.

9. The traveling assistance method according to claim 8, further comprising:
  predicting, by the processor, the action candidate that the other vehicle takes when the other vehicle fails to recognize the specified obstructed object, in accordance with a road structure around the host vehicle;
  comparing, by the processor, a behavior of the other vehicle with the action candidate so as to predict the action of the other vehicle; and
  controlling, by the processor, the host vehicle in accordance with the predicted action of the other vehicle.

10. The traveling assistance method according to claim 8, further comprising:
  controlling, by the processor, the host vehicle in accordance with the action candidate that the other vehicle takes when a behavior of the other vehicle and the action candidate are similar to each other.

11. The traveling assistance method according to claim 8, further comprising:
  controlling, by the processor, the host vehicle in accordance with a behavior of the other vehicle when the behavior is not similar to the action candidate.

12. The traveling assistance method according to claim 1, further comprising:
  predicting, by the processor, an action that the other vehicle takes in accordance with the estimated likelihood, by comparing a behavior of the other vehicle with the action candidate.

13. A traveling assistance device for predicting an action of another vehicle around a host vehicle to assist the host vehicle in traveling according to a predicted result, the device comprising:
  an object detection sensor configured to detect the other vehicle and objects around the host vehicle;
  a memory that is installed with a computer program that includes instructions and a predetermined rule for the traveling assistance device; and
  a processor that includes the memory and executes the instructions installed with the memory to:
    predict an action candidate that the other vehicle takes on a map;
    set a blind spot area that is a blind spot from the other vehicle based on positions of the detected objects, wherein the blind spot area is caused by the detected objects;
    specify an obstructed object by extracting an object present in the blind spot area among the detected objects;
    estimate a likelihood of the action candidate in accordance with the specified obstructed object predict an action that the other vehicle takes in accordance with the estimated likelihood; and
    utilize the predicted action that the other vehicle takes.

14. A traveling assistance method for predicting an action of another vehicle around a host vehicle to assist the host vehicle in traveling according to a predicted result, the method comprising:
  detecting, by an object detection sensor, the other vehicle and objects around the host vehicle;
  predicting, by a processor, action candidates that the other vehicle takes based on a map;
  setting, by the processor, a blind spot area that is a blind spot from the other vehicle based on positions of the detected objects, wherein the blind spot area is caused by the detected objects;
  specifying, by the processor, an obstructed object by extracting an object present in the blind spot area among the detected objects;
  estimating, by the processor, a first likelihood of each of the action candidates in accordance with the specified obstructed object;
  estimating, by the processor, a second likelihood of each of the action candidates by comparing with a behavior of the other vehicle;
  weighting, by the processor, each of the second likelihoods in accordance with each of the first likelihoods;
  predicting, by the processor, an action that the other vehicle takes in accordance with the action candidate having the highest second likelihood among the weighted second likelihoods; and
  utilizing, by the processor, the predicted action that the other vehicle takes.

15. The traveling assistance method according to claim 14, further comprising:
  estimating, by the processor, the second likelihood of each of the action candidates based on a difference between a primary course of the other vehicle and an effective course of the other vehicle, wherein the primary course of the other vehicle is predicted in accordance with a road structure around the host vehicle, and the effective course of the other vehicle is predicted in accordance with the behavior of the other vehicle.

* * * * *